9882X
W. Loomis,
Clover Huller.
Patented July 2. 1836.
Fig; 1.
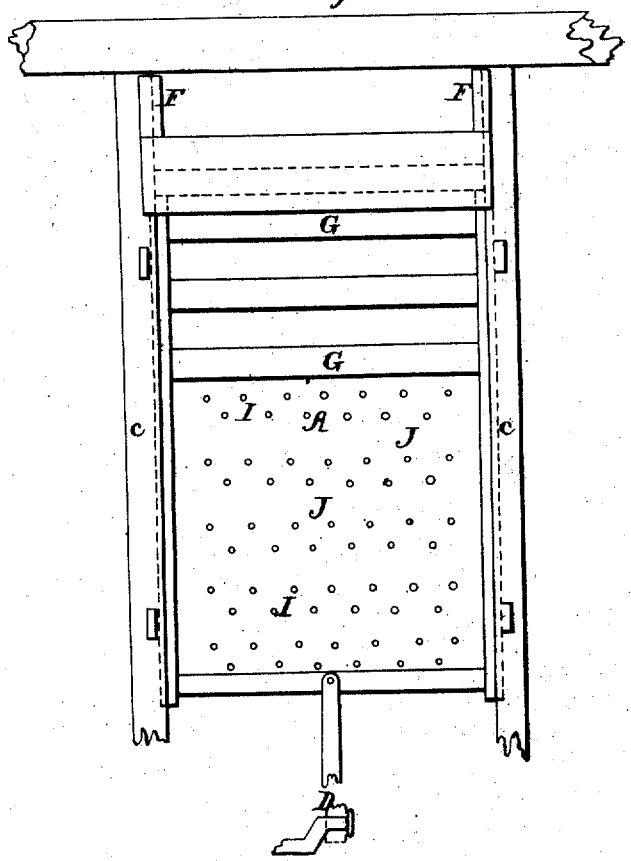
Fig; 2.
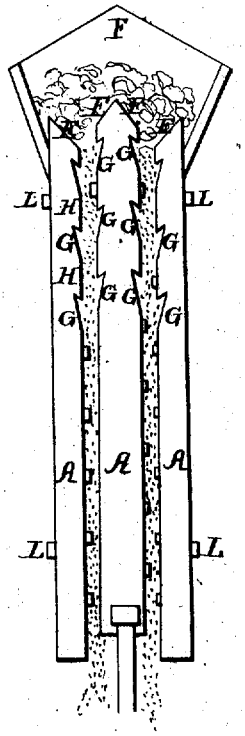

7/2/1836 9882X

July 2. 1836 17

William Gorrie [illegible]

The Schedule referred to in [illegible] Letters Patent and [illegible]
making part of the same [illegible]
the words of the said William [illegible] of his
Improvement in the Machine for [illegible]
[illegible]

---

To all whom [illegible] that [illegible]
that I William [illegible] of the County of
[illegible]
[illegible]
for [illegible]
the County [illegible]
[illegible]
[illegible] to [illegible]
[illegible] of the
[illegible]
to any former Patent [illegible] for the [illegible]
[illegible] that the Machine
[illegible]
[illegible]
effectually remedy [illegible]
of the Machine [illegible] the
usual quantity of [illegible] the
[illegible]
[illegible]
[illegible]
[illegible]
[illegible] between the
[illegible] building [illegible]
[illegible] in a vertical
[illegible]
[illegible] between the two parts &c. while the [illegible]

dle

7/2/1836 9882x dle one will be kept in Motion between them by the operation
of the crank D. as applied in the ordinary Saw Mill,
This combination of the three I profess therefore
will describe as such so that the rollers will be all for=
med alike after the following improved form Viz the up=
per end of each outside one is brought to an edge by a bevel
E. from the inside so that it will thus form a sharp one
for more easily penetrating the mass of seed that will be
placed in the hopper F above the rollers. A small space
below this bevel is formed another one as at G. though with
less slope than the one just mentioned, and so formed
according to the representation in section at fig 2 as to
form an angular channel or cavity of the upper or broken
edge of which serves to draw down and retain any seed that
the operation of the middle roller may introduce. Several
of these bevels or channels say three or more are placed
one below the other with intervals as at H. the remain=
ing space to the bottom of the roller is to be filled with
rows of nails as at I. also having intervals which are to
be repeated to the end J. Strips of sheet iron K may be
used instead of the nails by roughening the surface that they
may hold to the seeds which I perform by the sharp pointed
shaped chisel, which shall force out such a portion of the metal as to
project like unto a spike for the purpose mentioned.
The difference of the centre or those side rollers consist in hav=
ing each side armed with angular channels &c, & the
edge at top made by a double bevel and from each side the
more easily to penetrate the Stalks &c which will by the
crank motion to the middle roller draw the seed between
the rollers on each side from of the hopper. where it will
be restrained from rising out again by the channels or
[illegible]. Springs L. are affixed to the posts so as to press upon
the side rollers (which are stationary) for the purpose of pr=
ing

7/2/1836 9882X ing them against the middle one in order to produce
more friction amongst the seeds.

What I claim as my invention and for which I [illegible]
ask Letters Patent is the improvement above set forth
in the introduction of the bevel channel, with the bevel
edge, at the upper part of each roller for the accelerati[illegible]
of the passing process, and likewise for the retention of the seed
hulls when once fed in. In testimony that the above
is a full description of my improvement as invented by me
I have hereunto set my hand

Witnesses
Henry Stone
B. K. Morsell

William Francis (814 words)

[illegible]